United States Patent [19]

Olshausen

[11] Patent Number: 4,468,939
[45] Date of Patent: Sep. 4, 1984

[54] ACCESSORY LOCK AND ARTICLE STORAGE DEVICE FOR BICYCLES AND THE LIKE

[76] Inventor: Michael C. Olshausen, 1816 Calorama Rd., Apt. 105, Washington, D.C. 20009

[21] Appl. No.: 457,459

[22] Filed: Jan. 12, 1983

[51] Int. Cl.³ .............................................. E05B 73/00
[52] U.S. Cl. ............................................ 70/58; 70/63
[58] Field of Search ............... 70/1, 58, 59, 61, 63, 70/233–236; 220/4 R; 224/30 R

[56] References Cited

U.S. PATENT DOCUMENTS

| | | | |
|---|---|---|---|
| 3,766,759 | 10/1973 | Artner | 70/58 |
| 3,772,645 | 11/1973 | Odenz et al. | 70/234 X |
| 3,781,861 | 12/1973 | Adler, Jr. et al. | 70/233 X |
| 4,079,872 | 3/1978 | Halter | 70/233 X |
| 4,248,067 | 2/1981 | Sears | 70/63 X |
| 4,325,531 | 4/1982 | Omholt | 70/63 X |

FOREIGN PATENT DOCUMENTS

| | | | |
|---|---|---|---|
| 124227 | 3/1919 | United Kingdom | 70/233 |
| 566289 | 12/1944 | United Kingdom | 70/58 |

Primary Examiner—Gary L. Smith
Assistant Examiner—Thomas J. Dubnicka
Attorney, Agent, or Firm—Joseph J. Baker; Gerald J. Ferguson, Jr.

[57] ABSTRACT

An accessory lock and article storage device is set forth adapted to be attached to the frame of a bicycle or the like. The device has a pair of complementary members which both enclose a portion of the accessory and the frame when the members are brought into engagement with each other as well as form an enclosed space for storing small articles. A lock is also provided for locking the members together and to effect frictional securement of the accessory and the frame relative to the members.

6 Claims, 7 Drawing Figures

ACCESSORY LOCK AND ARTICLE STORAGE DEVICE FOR BICYCLES AND THE LIKE

BACKGROUND OF THE INVENTION

This invention relates to locking devices and more specifically to a device for both removably securing an accessory such as a tire pump to a bicycle as well as providing an enclosed space for storing small articles.

PRIOR ART AND OBJECTS

Applicant is unaware of any single device capable of both securing against theft an accessory such as a tire pump to a bicycle or the like and providing a locked enclosure for storing small articles such as tire patches, tire irons, etc. Devices are known for securing just accessories such as tire pumps to bicycle frames, examples of which are disclosed in Swiss Pat. No. 222,421 (1942) and French Pat. No. 889,103 (1943), however, no provision is made for storing against theft the related articles such as tire patches, tire irons for removing the tire from the inner tube, spare brake or derailleur cables, and other necessary or valuable articles. Lock boxes for bicycles and the like are also well known, however, for practical reasons none are both sufficiently large to secure against theft an elongated accessory such as a tire pump or the like as well as other articles and yet sufficiently small to mount conveniently on a bicycle.

It is therefore the primary object of the present invention to provide a single, novel device attachable to the frame of a bicycle or the like for securing against theft an accessory such as a tire pump as well as other small articles.

It is another object of the invention to provide a device of the subject nature which, due to its unique construction, can be easily attached to or removed from a frame member of a bicycle or the like by a person without mechanical skill, which is water resistant, and which can be simply unlocked for removal of the secured accessory or stored article.

It is yet another object of the invention to provide a device which is relatively inexpensive to make yet is light in weight, rugged, and very theft resistant.

Other objects and advantages of the present invention will become apparent and obvious from a study of the following description and accompanying drawings, which are merely illustrative of the present invention.

DESCRIPTION OF PREFERRED EMBODIMENTS

Figure 1:
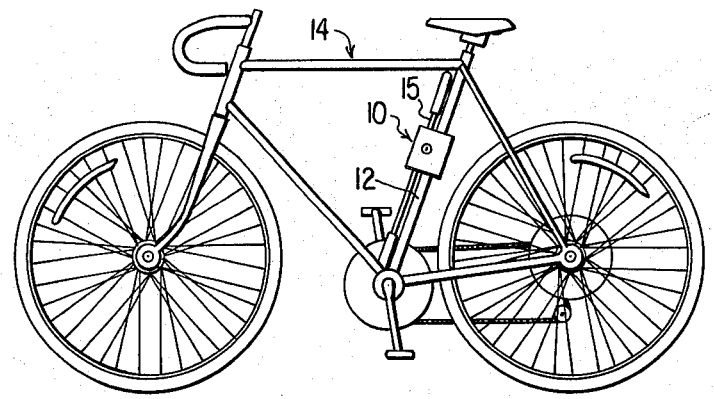
FIG. 1 is a pictorial view of a bicycle showing the accessory lock and article storage device of the present invention mounted thereon.
Figure 2:
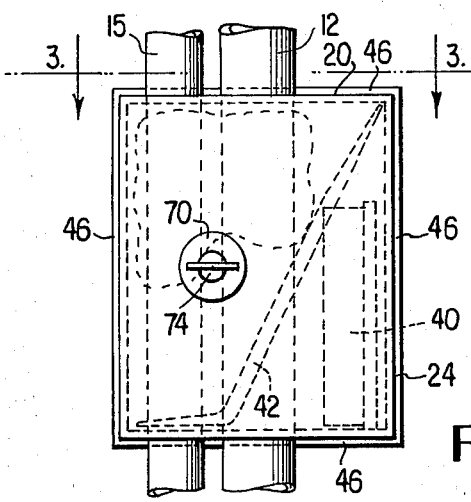
FIG. 2 is an elevational view of the side of the device on which the lock mechanism is mounted.
Figure 3:
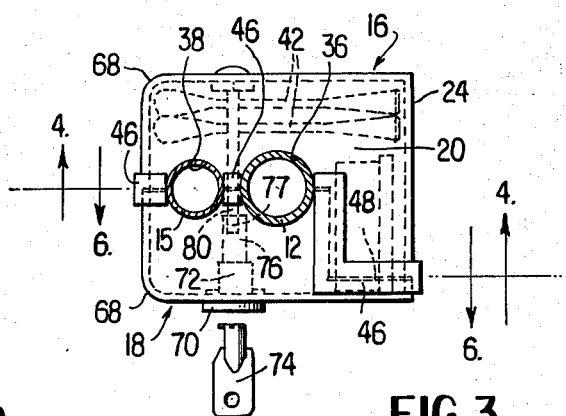
FIG. 3 is a plan view of the device taken along the lines 3—3 of FIG. 2.
Figure 4:
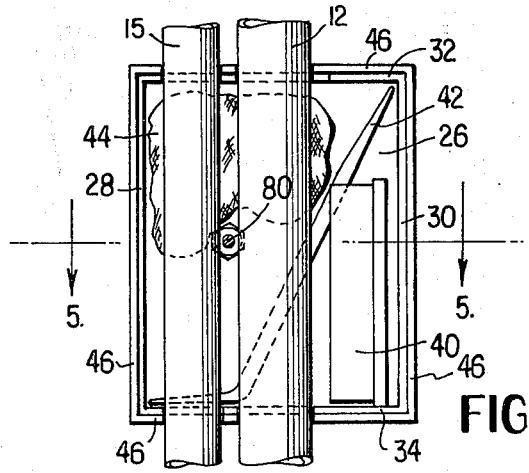
FIG. 4 is a side view of the device in partial cross-section taken along the lines 4—4 of FIG. 3.
Figure 6:
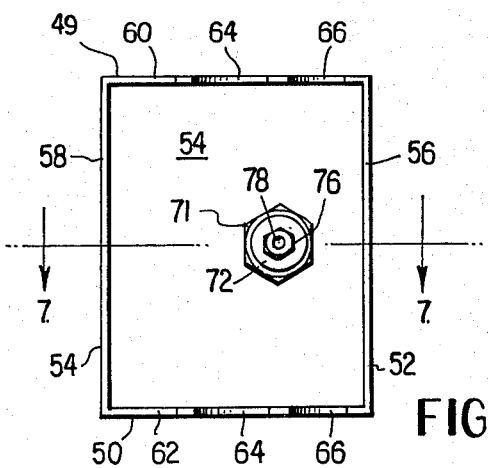
FIG. 6 is a side view of the device taken along the lines 6—6 of FIG. 3.
Figure 5:
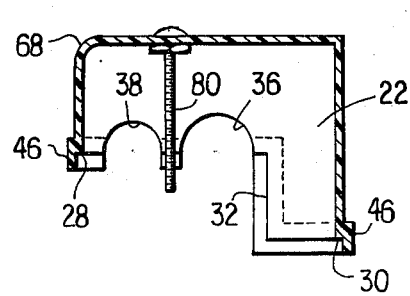
FIG. 5 is a plan view of the device in partial cross-section taken along the lines 5—5 of FIG. 4.
Figure 7:
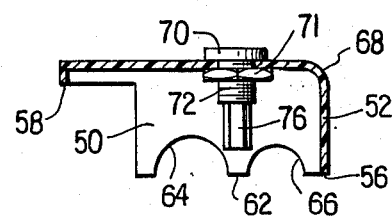
FIG. 7 is a plan view of the device taken along the lines 7—7 of FIG. 6.

Referring now to the drawings where like characters of reference indicate like elements in each of the several views, there is illustrated generally at 10 in FIG. 1 the accessory lock and article storage device of the present invention mounted to a frame member 12 of a bicycle 14 and securing a tire pump 15.

The device, as can be seen by referring to FIGS. 2–7, has a first member 16 and a second member 18 which when assembled form a generally box-shape structure. The first member 16 has parallel spaced-apart top and bottom walls 20,22, respectively, which are joined by means of a side wall 24 to form an enclosed area 26 with an open end. The open end is defined by the edges 28,30 of side wall 24 and edges 32,34 of top and bottom walls 20,22 respectively. The edges 32 and 34 each have a scalloped or semi-circular portion 36 which are in registry with each other and which have a depth slightly less in length than the radius of the frame member 12. Similarly, the edges 32 and 34 also have a scalloped or semi-circular portion 38 which are in registry with each other and which have a depth slightly less in length than the radius of the mid-section of the tire pump 15 or similar article to be locked by the device. The function of the particular shape of scalloped portions 36,38 will be more fully discussed later.

The configuration of top wall 20 and more specifically bottom wall 22 is substantially L-shaped which provides maximum surface area for holding small articles to be stored such as a box of tire patches 40, tire irons 42 and a clean-up rag 44, for example, and prevents them from falling out when the second member 18 is removed. A flange element 46 is also provided which is preferably integrally formed with the top, bottom and side walls 20,22, 24, respectively, and extends a distance past the edges 28,30 and edges 32,34 with the exception of scalloped portions 36,38. The flange element 46 performs the functions of enabling the second member 18 to be quickly and accurately aligned with the first member 16 as well as to cover the slight gap 48 between the members thereby preventing to a substantial degree water and dirt from entering the device. The flange 46 also helps prevent the members 16,18 from being twisted or pried open.

The second member 18 has a top wall 49 and a bottom wall 50 which are joined by a side wall 52 to form an enclosed area 54. The open end is defined by edges 56,58 of side wall 52 and edges 60,62 of top and bottom walls 49,50, respectively. The edges 60,62 each have a scalloped or semi-circular portion 64 which is in registry and in shape similar to portion 36. Similarly the edges 60,62 each have a scalloped or semi-circular portion 66 which is in registry and in shape similar to portion 38. The shape of the top and bottom walls 49,50 is complimentary to the L-shape of top and bottom walls 20,22 such that when they are joined together a substantially rectangular shape results. The edges 68 can be rounded to provide a more aerodynamic shape and a less sharp edge should they accidentally be struck by the rider whose legs, however, spaced-apart by the pedals, allow ample clearance.

In order to keep the first member 16 and second member 18 together and in the desired position on the frame member 12, a locking mechanism 70 is provided. The locking mechanism 70 comprises a conventional rotary lock member 72 of the "vending machine"-type secured to side wall 52 of second member 18 by a nut 71 and operated by a key 74 of, for example, cylindrical type. A coupling 76 is secured to the lock member 72 and is rotated thereby. The coupling 76 has a threaded bore 78 which is in alignment with a correspondingly threaded shaft 80, such as a carriage bolt, secured at one end to side wall 24 of first member 16 and passing between frame member 12 and tire pump 15. The length of the shaft 80 is chosen so as to engage the entrance of bore 78 as the first and second members 16,18 are brought together so that a simple twist or rotation of the key 74 in the lock 72 will cause the threads of the coupling 76 to engage the corresponding threads of the shaft 80. Continued rotation of the key 74 causes the members 16,18 to draw together until the edges 28-34 engage the edges 56-62 and simultaneously the curved portions 36,64 frictionally engage the frame member 12 and curved portions 38,66 frictionally engage the tire pump 15 to secure same in their desired positions. As aforementioned, this frictional engagement results from the fact that the curved portions 36,64 and 38,66 do not form a perfect circle when joined but rather one which is slightly oblate. The depth 77 of full engagement of threaded shaft 80 by threaded bore 78 is slightly less than the distance flange element 46 extends beyond edges 28-34 minus the width of gap 48 so that flange element 46 overlaps member 18 when members 16 and 18 are initially brought together, thus holding member 16 in alignment with member 18 immediately before the coupling 76 has begun to engage threaded shaft 80. After the desired degree of tightness is achieved, the key 74 is removed. Frictional engagement prevents the device from sliding down frame member 12 and pump 15 when the bicycle is in motion.

Similarly, to open the device, the first member 16 is held in one hand while the key 74 is rotated with the other. After the second member 18 is unlocked, the tire pump 15 or the stored articles can be removed.

These and many different embodiments of this invention may be made without departing from the scope and spirit thereof. Therefore, it is to be understood that the invention is not limited to the specific embodiment shown and described herein, except as defined in the appended claims.

I claim:

1. An accessory lock and article storage device adapted to be attached to a frame of a bicycle or the like comprising:
   (a) first and second members each having a side wall connected to spaced-apart top and bottom walls, said side walls having facing portions, said first and second members together forming an enclosed storage space when brought into engagement with said frame member and said accessory, said top and bottom walls of said first and second members each having indented portions adapted to frictionally engage said frame member and said accessory, and
   (b) locking means for securing said first and second members together and extending through and connected to a central area of said facing portions, said locking means being further capable of drawing said first and second members toward each other to vary the degree of said frictional engagement of said first and second members relative to said frame member and said accessory.

2. A device as set forth in claim 1 wherein said top and bottom walls of said first member are substantially L-shaped to maximize the surface area for storage.

3. A device as set forth in claim 1 wherein said indented portions are congruent to the cross-section of said accessory and said frame member but with a depth slightly less than half the width of said accessory and said frame member.

4. A device as set forth in claim 1 wherein said first member has a flange element extending around at least a portion thereof to facilitate alignment of said second member with respect to said first member.

5. A device as set forth in claim 1 wherein said locking means extends between said side walls of said first and second members.

6. A device as set forth in claim 5 wherein said locking means further comprises a threaded member secured at one of its ends to said side wall of said first member, a (removable key operated) lock cylinder mounted on said side wall of said second member and operated by a key, and an intermediate member secured to said lock cylinder and rotatable by said key, said intermediate member being adapted to engage the other end of said threaded member to draw said first and second members toward each other.

* * * * *